(12) United States Patent
Sukonik et al.

(10) Patent No.: US 9,154,437 B2
(45) Date of Patent: Oct. 6, 2015

(54) DYNAMIC RESHUFFLING OF TRAFFIC MANAGEMENT SCHEDULER HIERARCHY

(71) Applicant: Marvell Israel (M.I.S.L) Ltd., Yokneam (IL)

(72) Inventors: Vitaly Sukonik, Katzir (IL); Einat Ophir, Tel Mond (IL); Rafi Tamir, Petach-Tikva (IL); Mark Dunaevsky, Kfar Saba (IL)

(73) Assignee: MARVELL ISRAEL (M.I.S.L) LTD. (IL)

( * ) Notice: Subject to any disclaimer, the term of this patent is extended or adjusted under 35 U.S.C. 154(b) by 294 days.

(21) Appl. No.: 13/751,934

(22) Filed: Jan. 28, 2013

(65) Prior Publication Data
US 2013/0194922 A1 Aug. 1, 2013

Related U.S. Application Data

(60) Provisional application No. 61/592,937, filed on Jan. 31, 2012, provisional application No. 61/636,311, filed on Apr. 20, 2012.

(51) Int. Cl.
*H04L 12/869* (2013.01)
*H04L 12/54* (2013.01)
*H04L 12/873* (2013.01)
*H04L 12/803* (2013.01)

(52) U.S. Cl.
CPC ............ *H04L 47/60* (2013.01); *H04L 12/5693* (2013.01); *H04L 47/125* (2013.01); *H04L 47/522* (2013.01)

(58) Field of Classification Search
None
See application file for complete search history.

(56) References Cited

U.S. PATENT DOCUMENTS

| | | | | |
|---|---|---|---|---|
| 2005/0177644 A1* | 8/2005 | Basso et al. | ... | 709/232 |
| 2005/0281279 A1* | 12/2005 | Dennison et al. | ... | 370/412 |

* cited by examiner

*Primary Examiner* — Khoa Huynh

(57) ABSTRACT

There is provided a network device comprising a physical queue management processor configured to manage attributes of physical queues of data packets. The network device further comprises a scheduling processor which is configured to manage scheduling nodes that establish a scheduling hierarchy among the physical queues in a network, utilizing a bi-directional mapping of the physical queues to logical queues. The network device further comprises a traffic management processor which is configured to modify the bi-directional mapping mentioned above.

15 Claims, 3 Drawing Sheets

DYNAMIC RESHUFFLING OF TRAFFIC MANAGEMENT SCHEDULER HIERARCHY

CROSS-REFERENCE TO RELATED APPLICATIONS

The present invention claims priority from the following two prior applications: (1) U.S. Provisional Patent Application No. 61/592,937 filed on Jan. 31, 2012; (2) U.S. Provisional Patent Application No. 61/636,311 filed on Apr. 20, 2012; the disclosures of both prior applications are incorporated herein in their entirety by reference.

BACKGROUND

1. Field

The current disclosure relates to traffic management and queuing solutions which include hierarchical packet schedulers.

2. Background

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Traffic management and queuing solutions include packet (or cell) schedulers which have hierarchies; these hierarchies organize queues and traffic aggregations in the form of trees according to the network structure, and scheduling is performed on a contiguous range of queues or scheduling nodes and at each hierarchical level of the trees. The need for scheduling using queues may arise for example in a network in which allocation of resources to many competing independent entities must be performed. In such a case, the entities are arranged in queues awaiting allocation of the resources. Another scenario in which scheduling using queues is used is in managing the egress of messages in a network to ensure that a traffic volume remains within limitations imposed by service agreements even when new users are added, removed or migrated. In both cases, the queues may be arranged in queue ranges and the ranges may be associated with one or more scheduling nodes. A scheduling hierarchy of a scheduling node is thus an order with which specified queue ranges are serviced.

SUMMARY

One or more embodiments of the disclosure relate to a network device which dynamically decouples physical queues and logical queues in a scheduling hierarchy, to a network device which maps physical queues to a set of logical queues without emptying the physical queues, to a method for dynamically decoupling physical queues and logical queues in a scheduling hierarchy, and to a method for mapping physical queues to a set of logical queues without emptying the physical queues.

According to an embodiment of the present disclosure, there is provided a network device, comprising a physical queue management processor, configured to manage attributes of physical queues of data packets. The network device further comprises a scheduling processor which is configured to manage scheduling nodes that establish a scheduling hierarchy among the physical queues in a network, utilizing a bi-directional mapping of the physical queues to logical queues. The network device further comprises a traffic management processor which is configured to modify the bi-directional mapping mentioned above.

According to an embodiment of the present disclosure, there is provided a network device which comprises a traffic management processor which is configured to update, in a storage medium, an association of a scheduling node with a range of logical queues.

According to an embodiment of the present disclosure, there is provided a network device which comprises a traffic management processor configured to respond to a command specifying a physical queue and its associated scheduling node, by modifying the bi-directional mapping of the indicated physical queue to one of the logical queues, and wherein when the traffic management processor modifies the bi-directional mapping, the physical queues continue send and receive operations without interruption.

According to an embodiment of the present disclosure, there is provided a network device which comprises a traffic management processor configured to construct a range of contiguous logical queues, upon receiving a message which specifies an instruction to add the first plurality of physical queues to a scheduling node, the range including unmapped logical queues and a first plurality of logical queues mapped to a first plurality of physical queue. The network device is further configured to save in a storage medium a first entry which associates the range to a scheduling node, enable the first plurality of physical queues, disable a mapping between a second plurality of physical queues already associated with the scheduling node and a second plurality of logical queues, save in the storage medium a second entry which associates the unmapped logical queues in the range to the second plurality of physical queues, and enable the mapping between the second plurality of physical queues and the unmapped logical queues. Further, the traffic management processor is configured to save the first entry to include a first queue number and a second queue number, the first queue number indicating the beginning of the range and the second queue number indicating the end of the range.

According to yet another embodiment of the present disclosure, there is provided a method which when executed by a network device causes the network device to receive a message specifying an instruction to move a first plurality of physical queues associated with a first scheduling node of a network and with a first plurality of logical queues to a second scheduling node of the network. The network device further constructs a range of contiguous logical queues, the range including unmapped logical queues and a second plurality of logical queues mapped to a second plurality of physical queues associated with the second scheduling node, saves in a storage medium a first entry which associates the range to the second scheduling node, enables the second plurality of physical queues, disables a first mapping between the first plurality of physical queues associated with the first scheduling node and the first plurality of logical queues, saves in the storage medium a second entry which associates the unmapped logical queues in the range to the first plurality of physical queues, and enables a second mapping between the first plurality of physical queues and the unmapped logical queues.

DRAWINGS

DETAILED DESCRIPTION

Embodiments will be described below in more detail with reference to the accompanying drawings. The following detailed descriptions are provided to assist the reader in gaining a comprehensive understanding of the methods, apparatuses, and/or systems described herein and equivalent modifications thereof. Accordingly, various changes, modifications, and equivalents of the methods, apparatuses, and/or systems described herein will be apparent to those of ordinary skill in the art. Moreover, descriptions of well-known functions and constructions may be omitted for increased clarity and conciseness.

The terms used in the description are intended to describe embodiments only, and shall by no means be restrictive. Unless clearly used otherwise, expressions in a singular from include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Figure 1A:
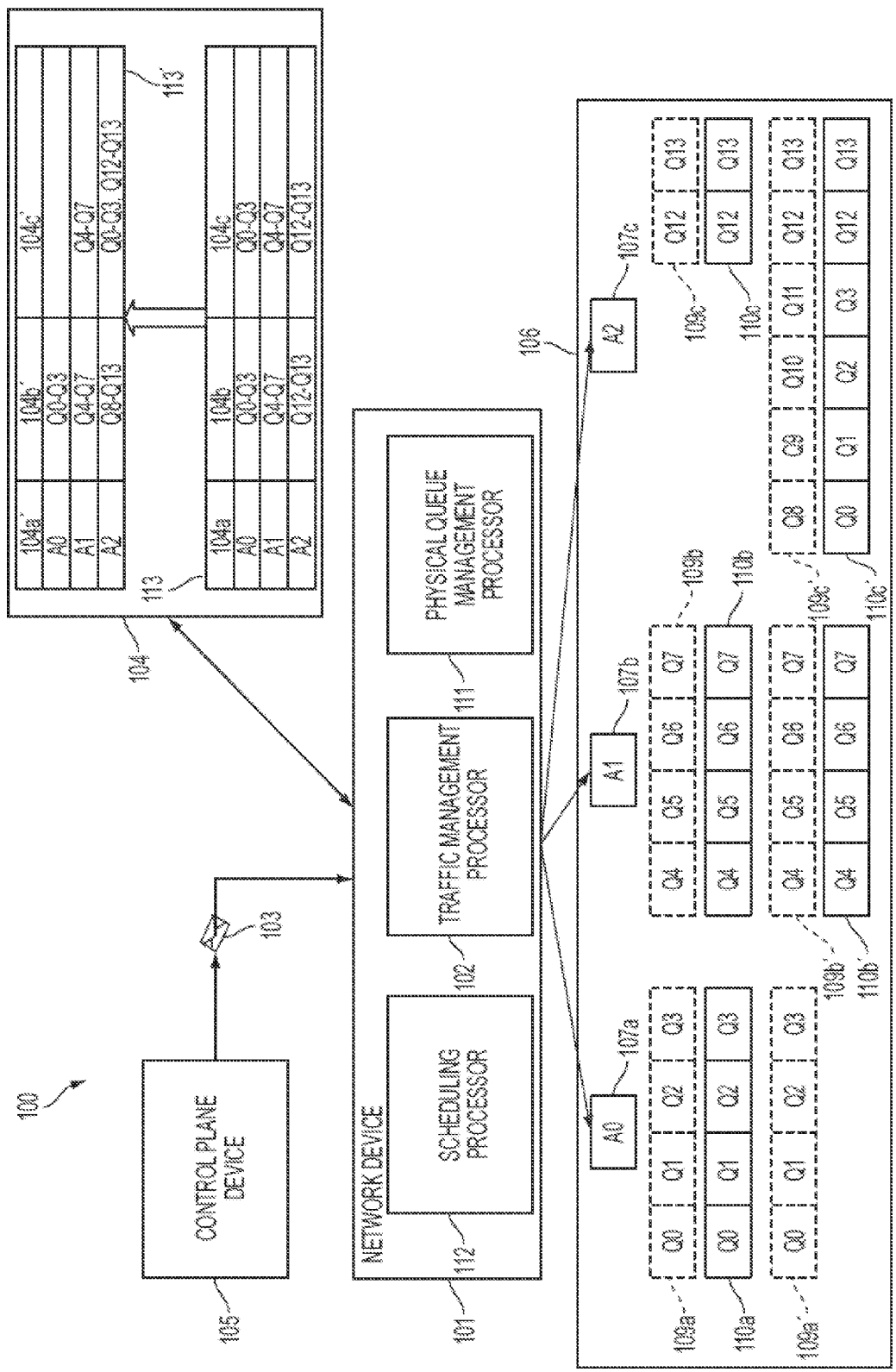
FIG. 1A illustrates a network device which is configured to modify a bi-directional mapping between logical and physical queues associated with a scheduling node according to an embodiment of the present disclosure.

FIG. 1A shows an embodiment 100 of the present disclosure. Reference numeral 106 generally indicates a network of scheduling nodes and their queues. Only three scheduling nodes and only a limited number of queues are illustrated, for the sake of simplicity of explanation.

The three scheduling nodes 107a, 107b, and 107c have respective node identifiers A0, A1, and A2. The scheduling nodes 107a, 107b, and 107c are collectively referred to herein as scheduling nodes 107 of network 106.

The scheduling nodes 107 are associated with logical queue ranges. In particular, scheduling node 107a is associated with logical queue range 109a; scheduling node 107b is associated with logical queue range 109b; and scheduling node 107c is associated with logical queue range 109c. The logical queue ranges 109a, 109b, and 109c may be collectively referred to as logical queue ranges 109. Logical queue ranges 109 are shown in dashed-line boxes to reinforce the point that these are logical queues and not physical queues. FIG. 1A also includes logical queue ranges 109a', 109b', and 109c' which depict an arrangement of the same logical queues 109 of the same scheduling nodes 107, after certain changes due to certain operations, which will be discussed further below.

The logical queue ranges 109 are associated with physical queue ranges. In particular, logical queue range 109a is associated with physical queue range 110a; logical queue range 109b is associated with physical queue range 110b; and logical queue range 109c is associated with physical queue range 110c. The physical queue ranges 110a, 110b, and 110c may be collectively referred to as physical queue ranges 110. Physical queue ranges 110 are shown in solid-line boxes to help the reader understand that these represent physical queues, as opposed to the dashed-line boxes for logical queue ranges 109 which do not represent physical queues. FIG. 1A also includes physical queue ranges 110b', and 110c' which depict an arrangement of physical queue range 110b and physical queue range 110c, after certain changes due to certain operations, which will be discussed further below.

Logical queue range 109a is depicted as including logical queues identified by queue identifiers Q0, Q1, Q2, and Q3. Thus, logical queue range 109a includes a range of logical queues Q0-Q3. Likewise, logical queue range 109b includes the range of logical queues Q4-Q7 and logical queue range 109c includes logical queues Q12-Q13. Similarly, physical queue range 110a includes physical queues Q0-Q4; physical queue range 110b includes physical queues Q4-Q7; and physical queue range 110c includes physical queues Q12-Q13.

Reference numeral 104 refers to a storage medium configured to store, in an embodiment, information pertaining to logical queue ranges 109, physical queue ranges 110, and scheduling nodes 107. In one example embodiment, the scheduling nodes 107, the logical queue ranges 109, and the physical queue ranges 110 are associated with each other by way of an association table 113 depicted as residing in storage medium 104. The use of a table, such as that depicted in FIG. 1A, is just an example. Such an association or mapping may be represented or implemented in any of a variety of forms, including, without limitation, a list, map, or other structure.

For the sake of explanation, the association table 113 is depicted as including three fields which each correspond to a column, with a record. The columns of association table 113 include identifiers corresponding to the scheduling nodes 107, the logical queue ranges 109, and the physical queue ranges 110. More particularly, the association table in storage medium 104 includes a scheduling node field 104a, a logical queue field 104b, and a physical queue field 104c. The scheduling node field 104a includes the identifiers of scheduling nodes 107. The logical queue field 104b includes the identifiers of logical queue ranges 109. The physical queue field 104c includes the identifiers of physical queue ranges 110.

In the first row of the association table, the scheduling node field 104a indicates scheduling node A0 (which is the identifier corresponding to 107a). The logical queue field 104b indicates logical queues in a range from Q0-Q3. The appearance of A0 on the same line with Q0-Q3, in their respective scheduling node and logical queue fields, indicates that scheduling node A0 is associated with logical queues Q0, Q1, Q2, and Q3. Although the logical queue field could be implemented with a complete list of each of the logical queues Q0, Q1, Q2, and Q3, the implementation in which a range Q0-Q3 is indicated saves space by requiring only a range start identifier (i.e., "Q0") and a range end identifier (i.e., "Q3"), and using the convention that identifiers of queues within the range spanned by Q0 and Q3 are incremented, i.e. the range is comprised of Q0, Q1, Q2, and Q3.

In the first row of the association table 113, the physical queue field 104c indicates physical queues in a range from Q0-Q3. The appearance of Q0-Q3 in the logical queue field 104b, and the appearance of Q0-Q3 in the physical queue field 104c, indicates that logical queues Q0, Q1, Q2, and Q3 are associated with physical queues Q0, Q1, Q2, and Q3, respectively. Transitively, an association between scheduling node A0 and physical queues Q0-Q3 is also indicated by the association table 113 in storage medium 104.

Inasmuch as the first row of the association table 113 indicates a mapping of logical queues Q0-Q3 with physical queues Q0-Q3, the row also indicates a mapping of physical queues Q0-Q3 with logical queues Q0-Q3. The structure of the association table 113 in storage medium 104 therefore indicates a bi-directional mapping between logical and physical queues. Association table 113' depicts the contents of association table 113 after certain changes due to certain operations, which will be discussed further below. Such operations for example may include, without limitation, moving physical queue range 109a from scheduling node 107a to scheduling node 107c.

Although the association table 113 of the storage medium 104 shows several fields (104a-b), each corresponding respectively to a scheduling node field 104a, a logical queue field 104b, and a physical queue field 104c, the present disclosure is not limited to such an arrangement. It is noted that the foregoing information, namely the identifiers and their respective associations as illustrated in FIG. 1, may be recorded in a suitable alternative format.

Moreover, while storage medium 104 is shown as an independent component, storage medium 104 may be implemented as a memory unit shared among a plurality of devices located either in or out of network 106 or at the edge of network 106 if network 106 is an access segment of a datacenter comprising multiple access segments joined via an interconnecting layer. Furthermore, storage medium 104 may include additional information, such as other attributes of the physical queue ranges 110 and of the logical queue ranges 109.

For example, attributes of physical Q0 located in physical queue range 110a may include, without limitation, an identifier which specifies the mapping of the physical Q0 to a logical queue (in this case logical queue Q0 in logical queue range 109a).

Similarly, attributes of logical queue Q0 located in logical queue range 109a may include, without limitation, an identifier which indicates the mapping of logical queue Q0 to a physical queue (in this case physical queue Q0 located in physical queues 110).

Although a single attribute has been described with respect to logical queue ranges 109 and logical queue ranges 110, it is noted that other attributes not specifically listed herein fall well within the scope of the present disclosure.

In FIG. 1A, storage medium 104 is shown with not only fields 104a, 104b, and 104c, but also fields 104a', 104b', and 104c'. These depict the contents of the same fields 104a, 104b, and 104c, after certain changes due to certain operations, which will be discussed further below. Such operations for example may include, without limitation, moving physical queue range 109a from scheduling node 107a to scheduling node 107c.

Further, according to the present embodiment, a network device 101 is provided. The network device 101 comprises a physical queue management processor 111 which is configured to manage attributes of physical queue ranges 110, a scheduling processor 112 which is configured to manage scheduling nodes 107 and attributes of logical queue ranges 109 associated with scheduling nodes 107.

The scheduling nodes 107 establish a scheduling hierarchy among the physical queues 110 utilizing a bi-directional mapping of the physical queues 110 to logical queues 109, wherein the bi-directional mapping is represented by data stored in storage medium 104. The network device 101 further includes a traffic management processor 102 which is configured to modify the bi-directional mapping and thus to effectively re-shuffle the scheduling hierarchy.

Turning to an example which illustrates one aspect of the present disclosure as described in embodiment 100, a control plane device 105 sends a message 103 which instructs the traffic management processor 102 of network device 101 to add, for instance, physical queues Q0 through Q3 of physical queue range 110a to physical queue range 110c. Physical queues Q0 through Q3 may correspond for example to queues of data packets originating from a plurality of network devices (not shown) located in network 106. Further, logical queues 109a include logical queue Q0 through logical queue Q3, and each logical queue in logical queue range 109a corresponds to the physical queue of physical queue range 110a bearing the same identifier. This means, for example, that logical queue Q0 of logical queue range 109a is associated with the physical queue Q0 of physical queue range 110a. Nevertheless, this specific mapping between logical queue ranges 109 and physical queue ranges 110 is only for illustrative purposes and is not limiting. In other words, the logical queues 109a need not bear the same identifier as that of their physical counterparts (physical queues 110a) because logical queues are virtual elements and as a result logical queue ranges need not include contiguous queues. In the example above, message 103 instructs the traffic management processor 102 to disassociate physical queues Q0 through Q3 from scheduling node A0 (107a) and associate them with scheduling node A2 (107c). Control plane device 105 may be a network device located in data plane dedicated solely for controlling devices at the edge of and within network 106. It is noted that while embodiment 100 shows that message 103 originates from control plane device 105, message 103 may originate from within network 106, or from devices located at the edge of network 106.

Upon receiving message 103, the traffic management processor 102 configures logical queues Q8-Q11 in logical queue range 109c' and saves an entry in storage medium 104 which maps the newly configured logical queues (i.e. Q8-Q11) in association with scheduling node A2 (107c) in storage medium 104 (see columns 104b' and 104c').

In this example embodiment, logical queues Q12 and Q13 in logical queue range 109c are assumed to be already associated with scheduling node A2 in storage medium 104. Next, the traffic management processor 102 enables physical queues Q12 and Q13 of logical queue range 109c and disables physical queues Q0-Q3 of physical queue range 109a. The traffic management processor 102 then remaps physical queues Q0-Q3 (see 110c') to logical queues Q8-Q11 (see 109c') and enables the physical queues Q0-Q3 once the mapping is complete.

As such, logical queues Q0-Q3 are mapped to logical queues Q8-Q11 which are associated with scheduling node A2 (107c). This reshuffling is conducted without emptying the physical queues and simply by changing an existing bi-directional mapping so as to map logical queues Q8-Q11 (see 109c' and 104b') and physical queues Q0-Q3 (see 110c' and 104c'). As such, according to an embodiment of the present disclosure, moving a queue range from one scheduling node to another can be done seamlessly and without emptying the physical queues because only the mapping between the physical queues and the logical queues is changed. This is achieved by decoupling the physical queues that are to be moved from the logical queues they are associated with prior to moving; this results in a dynamic reshuffling of the hierarchy as seen in FIG. 1B.

Therefore, according to an embodiment of the present disclosure, a new queue or queue range may be added to an existing queue range even if there is no free room in the existing queue range. Further, according to an embodiment, adding the new queue or queue range to the existing queue range does not adversely affect other queues in the existing queue range because the other queues in the existing queue range do not have to be moved in order to make room for the newly added queue or queue range. As such, according to an embodiment of the present disclosure, moving a new queue or queue range to an existing queue range does not disturb the flow of traffic.

Figure 1B:
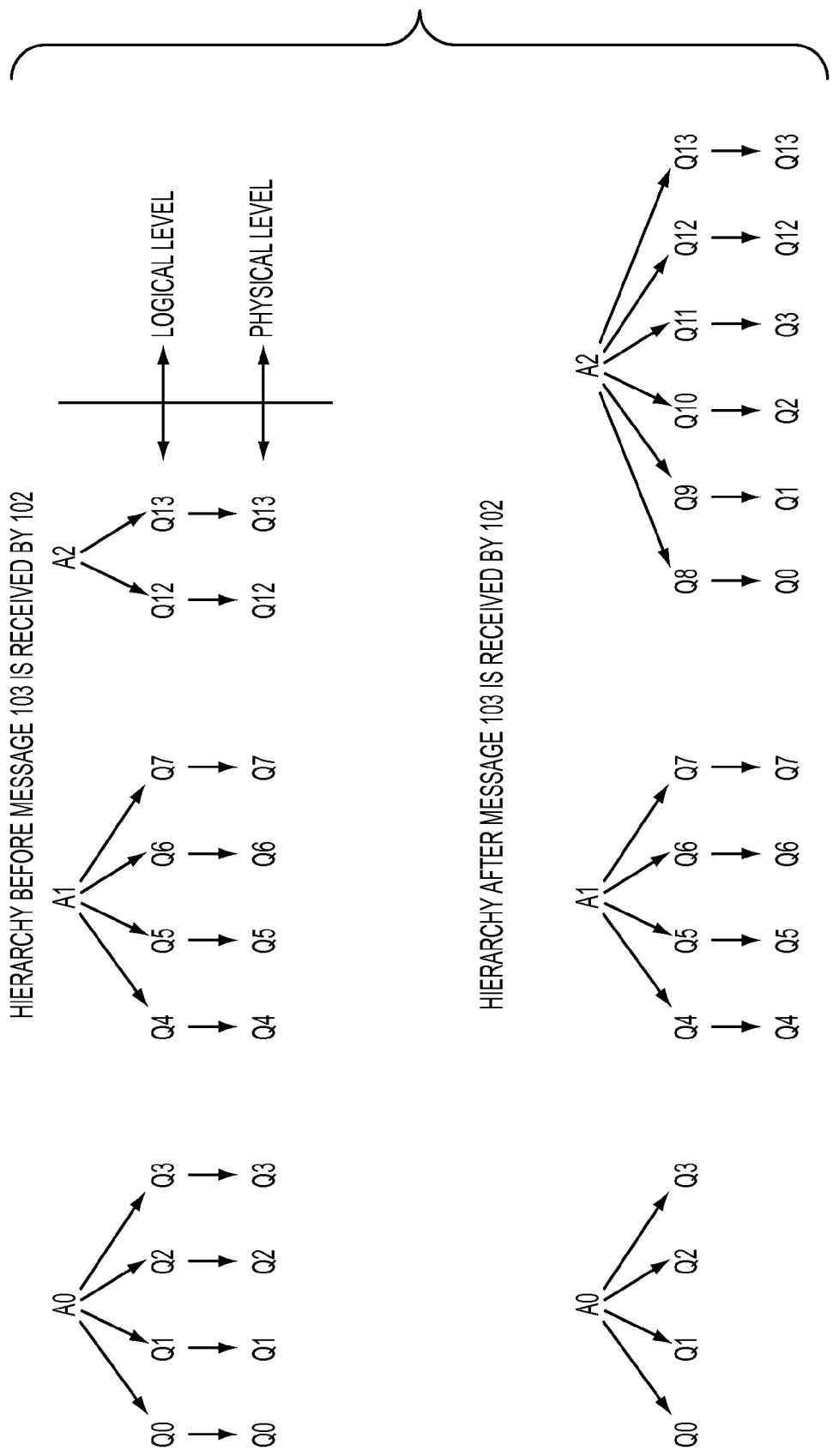
FIG. 1B illustrates a reshuffling of a scheduling hierarchy according to an embodiment of the present disclosure.

As shown in FIG. 1B, after the message 103 is received at traffic management processor 102, physical queues Q0-Q3 are remapped to logical queues Q8-Q11. Since Q8-Q11 are associated with scheduling node A2 (107c in FIG. 1A) and therefore, mapping Q0-Q3 to Q8-Q11 effectively "moves" physical queues Q0-Q3 to scheduling node A2 (107c).

Figure 2:
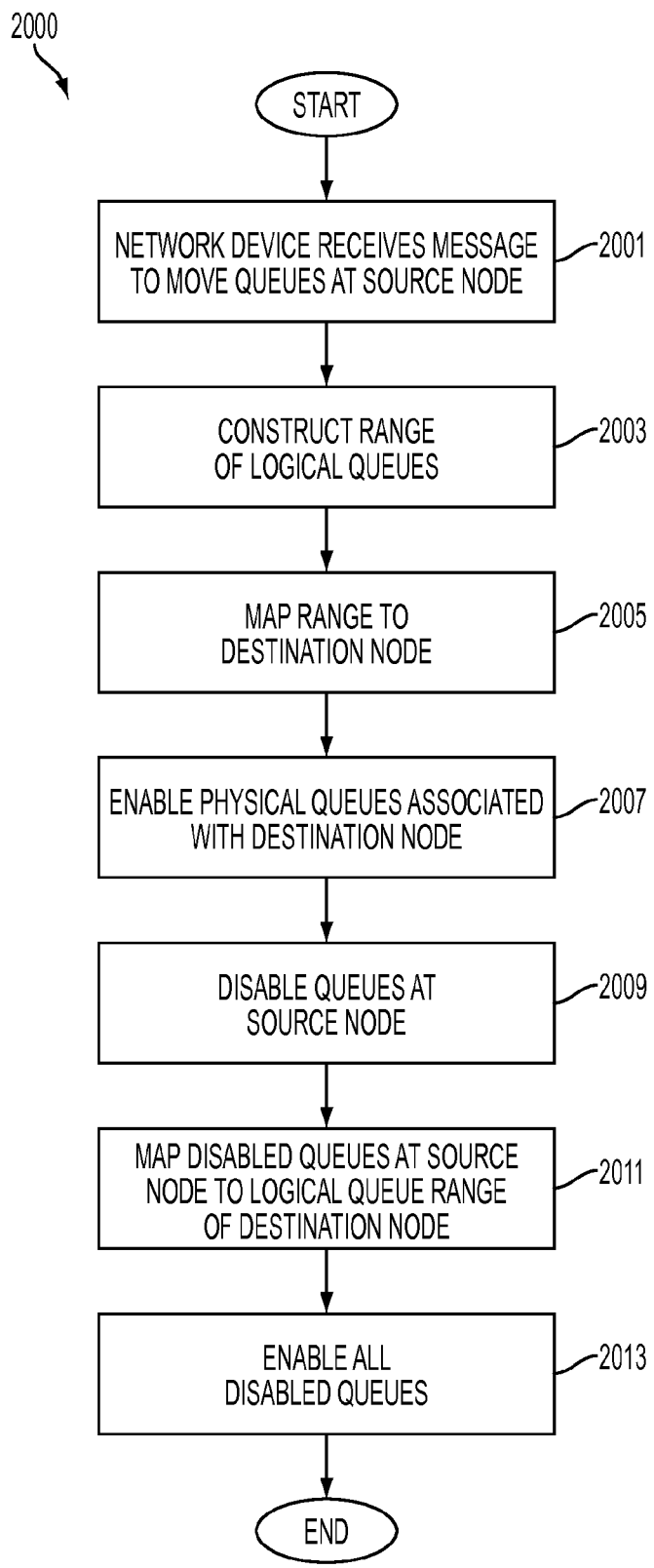
FIG. 2 illustrates a dynamic traffic management and scheduling method, according to an embodiment of the present disclosure, which, when executed by a network device, remaps logical queues to physical queues while leaving the physical queues unaffected.

According to an embodiment of the present disclosure, there is provided a method 2000 for dynamically reshuffling a scheduling hierarchy as illustrated in FIG. 2.

In method 2000, the network device 101 of FIG. 1A receives a message (operation 2001) which specifies an instruction to move a first plurality of physical queues associated with a source scheduling node of a network and with a first plurality of logical queues to a destination scheduling node of the network. In response to the message, the network device 101 constructs a range logical queues (operation 2003). The newly constructed range may be inserted within, before, or after existing logical queue ranges associated with the scheduling node.

For example, considering FIG. 1A, operation 2001 entails network device 101 receiving message 103 which specifies an instruction to join physical queue range 110a, which includes physical queues Q0-Q3, to physical queue range 110c resulting in the arrangement shown in 110c' (110a' is not shown since no physical queues remain associated with logical queue range 109a'). Further, in method 2000, network device 101 configures logical queues Q8-Q11 in logical queue range 109c' (operation 2003) and saves an entry in storage medium 104 (104b' and 104c') which maps the newly configured logical queues (i.e. Q8-Q11) in association with scheduling node A2 (107c) in storage medium 104 (operation 2005). Next, network device 101 enables physical queues Q12 and Q13 of logical queue range 109c (operation 2007) and disables physical queues Q0-Q3 of physical queue range 109a (operation 2009). Following these operations, network device 101 then maps physical queues Q0-Q3 to logical queues Q8-Q11 (operation 2011) and enables the physical queues Q0-Q3 (operation 2013) once the mapping is complete. As such, according to the present embodiment, when changing the scheduling hierarchy, only the mapping between physical queues and logical queues is changed. This does not require the physical queues to be emptied since changing the mapping is achieved without considering the contents of the physical queues but by considering only the physical queues' association to the logical queues.

Although the inventive concept has been described above with respect to the various embodiments, it is noted that there can be a variety of permutations and modifications of the described features by those who are familiar with this field, without departing from the technical ideas and scope of the features, which shall be defined by the appended claims.

Further, while this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

Although the drawings describe operations in a specific order and/or show specific arrangements of components, and are described in the context of scheduling nodes of a network, or that all the operations performed and the components disclosed are needed to obtain a desired result, there are numerous hardware and software devices that can be configured to reconfigure queues in the manner described in the present disclosure with respect to various embodiments. Accordingly, other implementations are within the scope of the following claims.

The invention claimed is:

1. A network device, comprising:
a storage medium configured to store a representation of an association of a first logical queue of a first scheduling node, among a plurality of scheduling nodes, to a first physical queue, wherein the plurality of scheduling nodes establish a scheduling hierarchy of one or more data packets respectively contained in the first physical queue;
a traffic management processor, implemented by hardware, configured to, responsive to an instruction to modify the scheduling hierarchy of the one or more data packets contained in first physical queue,
(i) configure a second logical queue with a second scheduling node of the plurality of scheduling nodes,
(ii) modify, within the storage medium, the representation of the association of the first logical queue to the first physical queue by (i) disassociating the first physical queue with the first logical queue of the first scheduling node, and (ii) associating the first physical queue with the second logical queue of the second scheduling node,
wherein the instruction to modify the scheduling hierarchy of the one or more data packets contained in first physical queue does not require emptying the one or more data packets respectively contained in the first physical queue.

2. The network device as set forth in claim 1, wherein the storage medium is further configured to store an association between a scheduling node, a logical queue range, and a physical queue range.

3. The network device as set forth in claim 1, wherein the traffic management processor is further configured to update, in the storage medium, an association of one of the plurality of scheduling nodes with a plurality of logical queues.

4. The network device as set forth in claim 3, wherein the traffic management processor is further configured to store in the storage medium, a logical queue range start identifier and a logical queue range end identifier in association with an entry of the one of the plurality of scheduling nodes.

5. The network device as set forth in claim 4, wherein the traffic management processor is further configured to store in the storage medium the entry, free of one or more logical queue identifiers intermediate with respect to the logical queue range start identifier and the logical queue range end identifier.

6. The network device as set forth in claim 1, wherein the traffic management processor is further configured to modify within the storage medium, the representation of the association of the first logical queue to the first physical queue without causing the first physical queue to stop sending and receiving operations.

7. The network device as set forth in claim 1, wherein the traffic management processor is further configured to assign one or more attributes to the second logical queue.

8. The network device as set forth in claim 1, wherein the traffic management processor modifies the representation of the association of the first logical queue to the first physical queue by associating the first physical queue with the second logical queue of the second scheduling node in a one-to-one manner.

9. A network device, comprising:
a storage medium configured to store a representation of an association of a first logical queue of a first scheduling node, among a plurality of scheduling nodes, to a first physical queue, wherein the plurality of scheduling nodes establish a scheduling hierarchy of one or more data packets respectively contained in the first physical queue;

a traffic management processor, implemented by hardware, configured to, responsive to an instruction to modify the scheduling hierarchy of the one or more data packets contained in first physical queue, (i) construct a range of second logical queues with a second scheduling node of the plurality of scheduling nodes, the range including an unmapped second logical queue and a second logical queue mapped to a second physical queue, (ii) modify, within the storage medium, the representation of the association of the first logical queue to the first physical queue by (i) disassociating the first physical queue with the first logical queue of the first scheduling node, and (ii) associating the first physical queue with the unmapped second logical queue of the second scheduling node, wherein the instruction to modify the scheduling hierarchy of the one or more data packets contained in first physical queue does not require emptying the one or more data packets respectively contained in the first physical queue.

10. The network device as set forth in claim 9, wherein the traffic management processor is further configured to:

store in the storage medium, a first entry which associates the range with the second scheduling node; and store in the storage medium a second entry which associates the unmapped second logical queue in the range to the first physical queue.

11. The network device as set forth in claim 9, wherein the traffic management processor modifies the representation of the association of the first logical queue to the first physical queue by associating the first physical queue with the second logical queue of the second scheduling node in a one-to-one manner.

12. A scheduling method when executed by a network device, comprising:

receiving a message specifying an instruction to move a first plurality of physical queues associated with a first scheduling node of a network and with a first plurality of logical queues to a second scheduling node of the network;

constructing a range of logical queues, the range including unmapped logical queues and a second plurality of logical queues mapped to a second plurality of physical queues associated with the second scheduling node;

saving in a storage medium a first entry which associates the range to the second scheduling node;

enabling the second plurality of physical queues;

disabling a first mapping between the first plurality of physical queues associated with the first scheduling node and the first plurality of logical queues;

saving in the storage medium a second entry which associates the unmapped logical queues in the range to the first plurality of physical queues; and enabling a second mapping between the first plurality of physical queues and the unmapped logical queues.

13. The method set forth in claim 12, wherein:

the message specifies an instruction to add the first plurality of physical queues to the scheduling node.

14. The method as set forth in claim 12, wherein:

the constructed range has a queue size equal at least to the number of queues in the first plurality of physical queues added to the number of queues in the second plurality of physical queues.

15. The method as set forth in claim 12, wherein:

the first entry includes a first queue number and a second queue number, the first queue number indicating the beginning of the range and the second queue number indicating the end of the range.

* * * * *